(12) United States Patent
Saluzzo et al.

(10) Patent No.: US 6,620,066 B2
(45) Date of Patent: Sep. 16, 2003

(54) DRIVE UNIT FOR AN ALTERNATOR OF A MOTOR VEHICLE

(75) Inventors: Sergio Saluzzo, San Pietro Val Lemina (IT); Donato Spina, Turin (IT)

(73) Assignee: Fiat Auto SpA, Turin (IT)

( * ) Notice: Subject to any disclaimer, the term of this patent is extended or adjusted under 35 U.S.C. 154(b) by 16 days.

(21) Appl. No.: 09/970,304

(22) Filed: Oct. 3, 2001

(65) Prior Publication Data

US 2002/0061798 A1 May 23, 2002

(30) Foreign Application Priority Data

Oct. 3, 2000 (IT) ..................................... TO2000A0920

(51) Int. Cl.$^7$ ............................................. F16H 59/00
(52) U.S. Cl. ............................ 474/74; 474/69; 464/36
(58) Field of Search .......................... 474/60, 70, 72, 474/74, 69; 192/56.6; 464/36, 38

(56) References Cited

U.S. PATENT DOCUMENTS

| | | | |
|---|---|---|---|
| 3,618,730 A | * 11/1971 | Mould, III | ................ 192/56.2 |
| 4,259,809 A | 4/1981 | Mabuchi et al. | ............... 46/249 |
| 4,644,824 A | 2/1987 | Shimizu | .................... 74/781 R |
| 4,870,875 A | * 10/1989 | Morishita | .................... 475/153 |
| 5,413,535 A | * 5/1995 | Reik | ........................... 474/94 |
| 5,855,518 A | * 1/1999 | Tanaka et al. | ................. 464/38 |
| 6,425,837 B1 | * 7/2002 | Ochiai | .......................... 474/70 |

FOREIGN PATENT DOCUMENTS

| | | |
|---|---|---|
| EP | 60022499 | 4/1985 |
| EP | 07259710 | 9/1995 |

* cited by examiner

Primary Examiner—Thomas R. Hannon
Assistant Examiner—Vicky A. Johnson
(74) Attorney, Agent, or Firm—Carter J. White; Howrey Simon Arnold & White LLP

(57) ABSTRACT

A drive unit for an alternator of a motor vehicle is provided with a driven pulley, which rotates around its own axis, and with a unit for connection of the pulley to a rotary drive shaft for the alternator; the drive unit is also provided with a revolution-multiplier device and a torque-limiter device, which are disposed in series with one another and constitute part of the unit for connection of the pulley to the shaft of the alternator.

6 Claims, 3 Drawing Sheets

DRIVE UNIT FOR AN ALTERNATOR OF A MOTOR VEHICLE

This application claims priority under 35 USC §119 of application number TO2000A000920, filed Jul. 3, 2000 in Italy.

The present invention relates to a drive unit for an alternator of a motor vehicle.

BACKGROUND OF THE INVENTION

As is known, alternators of motor vehicles each comprise a shaft which rotates around its own axis, and is rotated by a belt drive unit, which comprises a drive pulley keyed onto the drive shaft of the motor vehicle, a driven pulley which is keyed onto the shaft of the alternator, and a drive belt which is wound around the drive and driven pulleys. It is apparent that the speed of rotation of the shaft of the alternator depends on the speed of the drive shaft, and on a pre-determined drive ratio, which is defined by the ratio between the diameters of the drive and driven pulleys.

As is known, an alternator distributes a current which is all the greater, the greater the angular speed of its own shaft. In particular, the characteristic of the current distributed by the alternator comprises a first section, in which the current distributed increases as the angular speed of the shaft of the alternator increases, and a second section, in which the increase in the current becomes virtually negligible when the angular speed varies. In addition, the energy dissipated by the alternator increases as the speed of rotation increases, in particular owing to the forces of friction, and to the actuation of a corresponding cooling fan.

In order to meet the requirements for current of the electrical users of the motor vehicle in all conditions, without the battery of the motor vehicle itself deteriorating rapidly, the alternator must distribute a relatively high current, even at the minimum speed of rotation of the drive shaft. In order to fulfil this need, in general it is not possible to increase beyond a certain limit the diameter of the driven pulley, and therefore the transmission ratio of the known transmission units, owing to the need to restrict the dimensions.

Thus, alternators with a large size are used, which distribute a sufficiently high current even at low speeds of rotation, but have the disadvantage firstly that they are costly and heavy, and secondly that their capacity is not generally used to the maximum for most of the running conditions of the vehicle.

SUMMARY OF THE INVENTION

The object of the present invention is to provide a drive unit for an alternator of a motor vehicle, which makes it possible to solve the above-described problems simply and economically, at the same time limiting the dissipation of energy at high speeds of rotation of the drive shaft, and which, in particular, has limited dimensions.

According to the present invention, a drive unit is provided for an alternator of a motor vehicle, the alternator comprising a drive shaft which can rotate around its own first axis; the said drive unit comprising a driven pulley which can rotate around its own second axis; and means for connection of the said pulley to the said drive shaft; characterised in that it additionally comprises a revolution-multiplier device and a torque-limiter device, which are in series with one another.

Preferably, the said revolution-multiplier and torque-limiter devices form part of the said means for connection.

BRIEF DESCRIPTION OF THE DRAWINGS

The invention will now be described with reference to the attached drawings, which illustrate a non-limiting embodiment of it, in which.

DETAILED DESCRIPTION OF THE INVENTION

Figure 1:
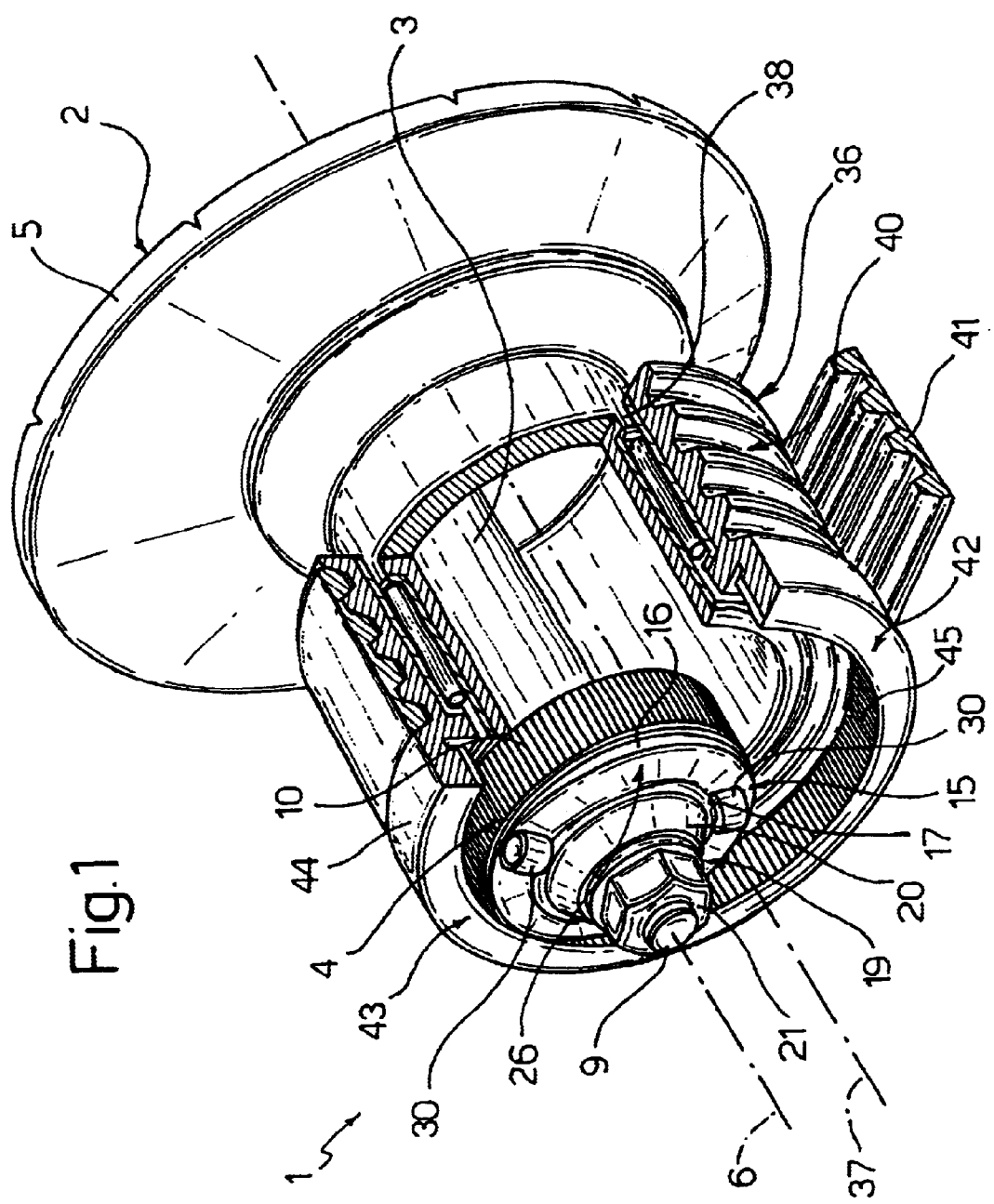
FIG. 1 illustrates in perspective and with parts removed for the sake of clarity, a preferred embodiment, according to the present invention, of the drive unit for an alternator of a motor vehicle.

With reference to FIG. 1, 1 indicates as a whole a drive unit for an alternator 2 (partially illustrated) of a motor vehicle (not illustrated).

The alternator 2 comprises an outer casing 5 (partially illustrated), and a drive shaft 3, onto which there is fitted a rotor (not illustrated), and which projects from the casing 5 along its own axis 6, and can rotate around the axis 6 itself, relative to the casing 5.

Figure 2:
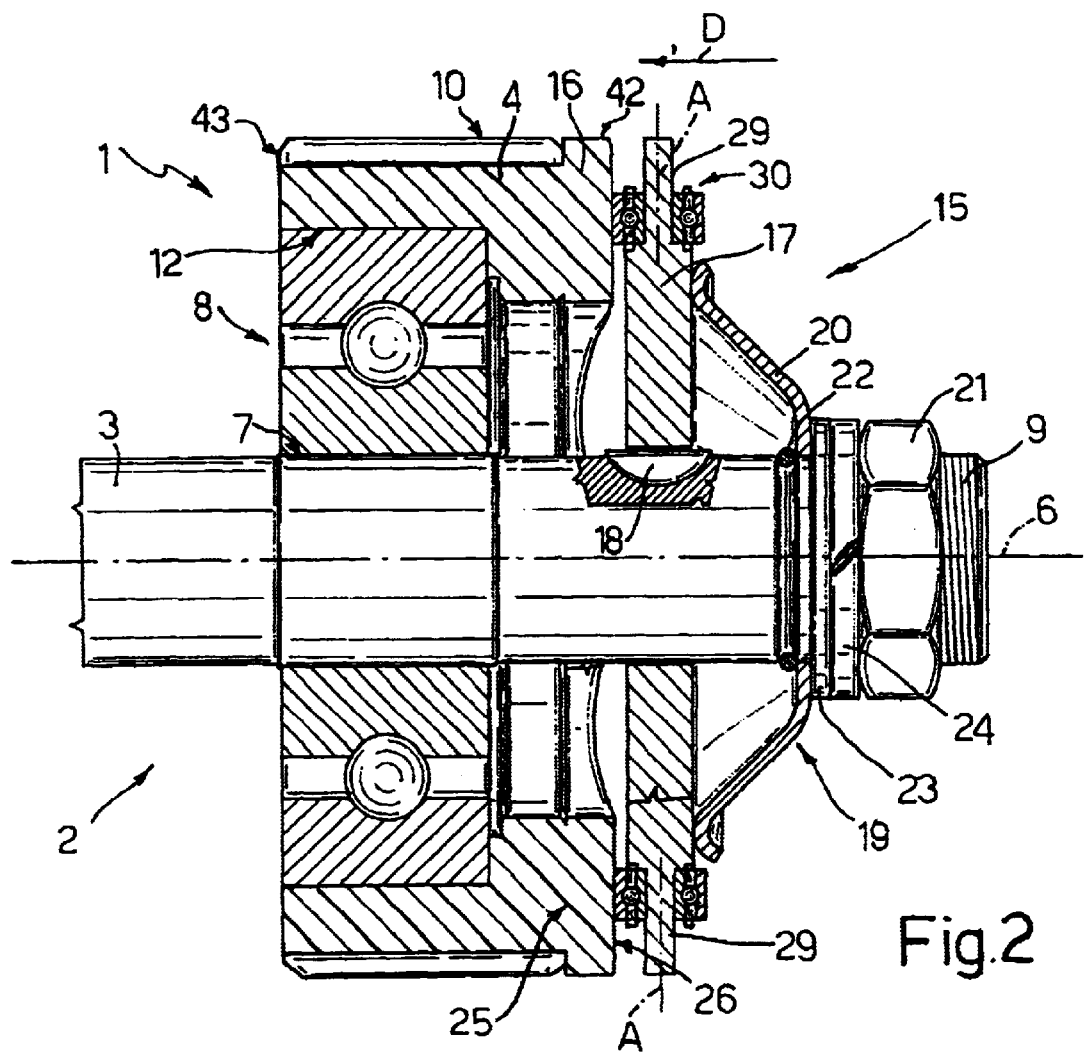
FIG. 2 illustrates the drive unit in FIG. 1 in axial cross-section, and with parts removed for the sake of clarity.

With reference to FIG. 2, the shaft 3 has a threaded end 9, and a seat 7 to accommodate a roller bearing 8, by means of which a wheel 4 is connected to the shaft 3, such as to rotate around the axis 6, and in a fixed axial position. The wheel 4 is in the shape of a ring, it has an inner circumferential seat 12 to accommodate the outer ring of the bearing 8, and is provided with outer toothing 10.

Between the wheel 4 and the shaft 3, there is interposed a torque-limiter device 15, which constitutes part of the unit 1, and comprises two rings 16 and 17 which face one another, coaxially relative to the shaft 3, and are disposed on the axial side opposite the wheel 4, relative to the casing 5.

The ring 16 is interposed axially between the ring 17 and the wheel 4, and is integral with the wheel 4 itself, whereas the ring 17 is connected in a position which is axially mobile and angularly fixed to the shaft 3, by means of a spline 18.

The device 15 additionally comprises a compression unit 19, which compresses the ring 17 against the ring 16, and comprises a Belleville spring 20 disposed in contact with the ring 17, with its own concavity facing the ring 17 itself. The Belleville spring 20 is coaxial relative to the shaft 3, and is secured at the threaded end 9 by means of a nut 21, a metal ring 22, a flat washer 23 and a groover washer 24.

Figure 3:
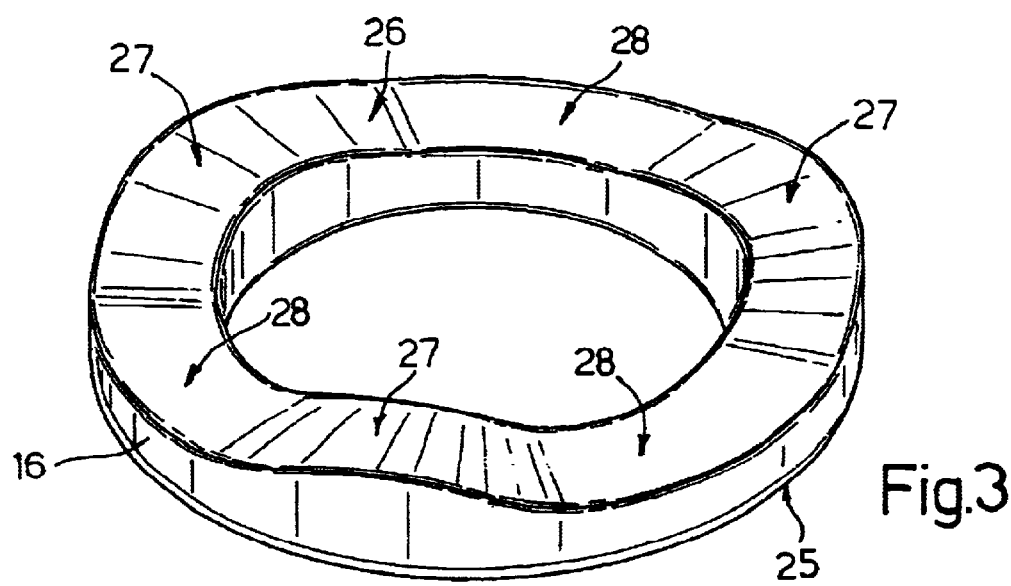
FIG. 3 is a perspective view of a detail of the drive unit in FIG. 1.
Figure 4:
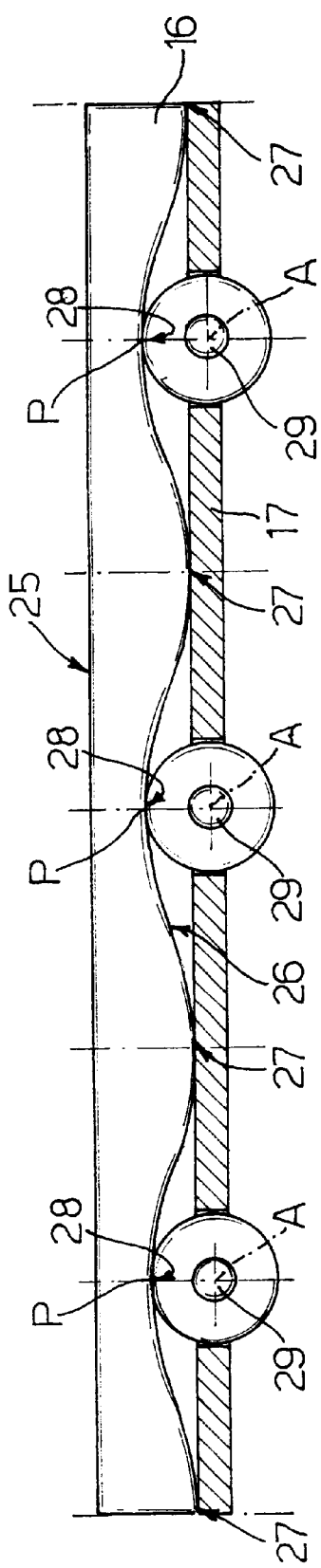
FIG. 4 is a view according to a plan development, of details of the drive unit in FIG. 1.

As illustrated in FIGS. 2 to 4, the ring 16 is delimited axially by a flat surface 25, which is disposed in contact with the wheel 4, and is rendered integral with the wheel 4 itself in a manner which is known and not illustrated, and by an undulating surface 26, which faces the ring 17. The surface 26 defines a circumferential track around the axis 6, and has three axial peaks 27, which are disposed at 120° around the axis 6, and are interposed by three depressions 28, which are disposed at 120° around the axis 6 itself, along the said track.

The ring 17 comprises three end radial pins 29, which have respective radial axes A, and are disposed at 120° around the axis 6, and on which there are fitted respective ball bearings 30, each of which comprises an inner ring placed on the respective pin 29, and an outer ring disposed in contact with the surface 26 of the ring 16.

As illustrated in FIG. 1 in particular, the unit 1 additionally comprises a pulley 36, which has its own axis 37 parallel and eccentric relative to the axis 6. The pulley 36 is fitted, in a fixed axial position, and such as to rotate around the axis 37, on a sleeve 38, which is connected integrally with the casing 5, and projects from the casing 5 itself, surrounding a section of the shaft 3.

The pulley 36 has a plurality of outer circumferential grooves 40, which are engaged by a drive belt 41 (partially illustrated), which in particular is of a known type such as poly-V, and is fitted onto the pulley 36 and onto a drive pulley (not illustrated), which is keyed onto a drive shaft of the motor vehicle.

The pulley 36 is connected to the shaft 3 by means of a connection unit 42, which comprises the torque-limiter device 15 and a revolution-multiplier device 43 in series with one another. In turn, the device 43 comprises the wheel 4 and an annular ring 44, which is rendered integral with an end of the pulley 36, extends beyond the sleeve 38, accommodates the wheel 4, and has inner toothing 45 which engages with the toothing 10, in order to rotate the wheel 4 itself around the axis 6.

In use, motion is transmitted by the belt 41 to the pulley 36, and from the latter to the wheel 4, thus producing a transmission ratio which is greater than the unit transmission ratio, and, in particular, is defined by the ratio of the diameters of the toothing 45 and 10. This transmission ratio multiplies the angular speed of the wheel 4 relative to that of the pulley 36, and increases the global transmission ratio between the drive shaft and the shaft 3, in comparison with the solutions which do not have revolution-multiplier devices.

The driving of the wheel 4 gives rise to rotation of the ring 16, which transmits the rotation to the ring 17, which opposes resistant torque C. In the starting stage, this torque C can be attributed substantially to the inertia of rotation, whereas, in the subsequent stages, it can be attributed to the characteristic of absorption of the alternator 2, and to the friction, such that the torque C increases rapidly when the angular speed of the shaft 3 increases.

The spring 20 exerts direct compression force in the direction D (FIG. 2), parallel to the axis 6, in order to compress the ring 17 against the ring 16, and to place the bearings 30 in the position of the depressions 28. The point of contact of each bearing 30 with the surface 26 is indicated as P in FIGS. 4, 5a, 5b.

Figure 5B:
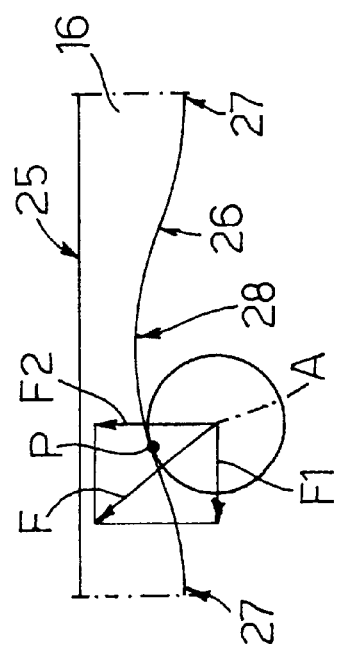
FIGS. 5a and 5b are partial views of the development in FIG. 4, in two operative positions of the drive unit in FIG. 1.
Figure 5A:
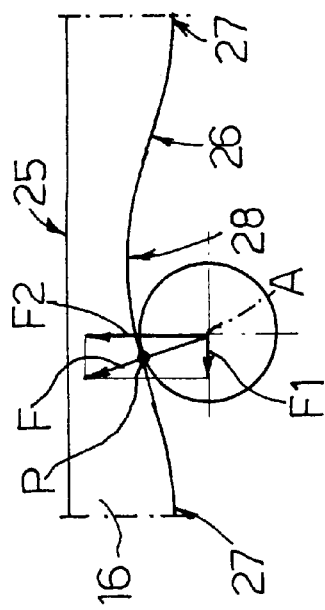

As illustrated in FIG. 5a, on each bearing, the torque C gives rise to a tangential force F1 relative to the axis 6, which is applied in the position of the axis A, to which there is also applied a force F2, which is determined by the spring 20, parallel to the axis 6 itself, and directed towards the surface 26. When the speed of rotation increases, the force F1 increases, whereas the force F2 increases when the deformation according to the mechanical characteristic of the spring 20 increases. In other words, the force F2 is all the greater, the more the bearings 30 are in the position of a peak 27.

FIG. 5a shows a stage of equilibrium, i.e. a stage in which the result F of the forces F1 and F2 is applied to the axis A of the pin 29, and is directed towards the point of contact P, and the ring 16 and the ring 17 rotate at the same speed. FIG. 5b shows a rolling stage, i.e. a stage in which the result F applied to the axis A is not directed towards the point P, and gives rise to rolling of the bearing 30 along the surface 26, such that the rings 16 and 17 rotate relative to one another.

The device 15 is calibrated by means of pre-compression of the spring 20, such as to give rise to rolling, when a limit speed of the shaft 3 is exceeded, such that the increase in current distributed by the alternator 2 would be negligible, and the increase in dissipation of energy would become significant.

When this limit speed of the shaft 3 has been reached, the corresponding value of resistant torque C is such that the bearings 30 pass beyond the peaks 27, but the ring 16 continues to rotate the ring 17, owing to the gradient of the sections which are contained between the depressions 28 and the peaks 27.

During the rolling stage, the angular speed of the shaft 3, and thus the torque C, do not increase, and it is then possible for a new condition of equilibrium to arise.

The above-described device 15 prevents the shaft 3 from rotating at a speed greater than a pre-determined limit speed, exceeding of which would not only fail to provide any significant increase of current, but would also give rise to a significant increase in resistant torque C, and thus to a significant absorption of energy.

It is apparent from the foregoing description that the unit 1 makes it possible to use an alternator 2 of a relatively limited size, for example a 70 Amp alternator instead of a 100 Amp alternator, and thus to limit the weights and costs of the corresponding motor vehicle, at the same time limiting the dissipation of energy of the alternator 2 itself at high speeds of rotation of the drive shaft.

In fact, even at low speeds of rotation of the drive shaft, the current which is distributed by a small-sized alternator 2 is sufficient to meet the needs of the electrical users of the corresponding motor vehicle, owing to the high ratio of transmission present between the drive shaft of the motor vehicle itself and the shaft 3. The fact that this transmission ratio is high, compared with the known solutions, is owing substantially to the device 43. In particular, it is possible to select a transmission ratio between the pulley 36 and the wheel 4 which is equivalent even to 5, without varying the normal transmission ratio present between the drive shaft and the pulley 36. At the same time, the output of the alternator 2 is not adversely affected at high speeds of the drive shaft, owing to the presence of the device 15 disposed in series with the device 43.

Furthermore, again as a result of their synergic actions, the devices 15 and 43 in series with one another make it possible to reach the said limit speed of the shaft 3 very quickly, and thus to make the best possible use of the maximum electric power which can be distributed by a small-sized alternator 2.

In fact, when the speed of rotation of the drive shaft of the motor vehicle increases, the alternator 2 reaches in a relatively short time an optimal operating condition, in which the quantity of current distributed is virtually constant, and close to the maximum value permitted by the capacity of the alternator 2 itself, but the dissipation of energy of the alternator 2 is still relatively low, such that a high output is obtained for virtually every speed of rotation.

The dimensions of the unit 1 are also extremely small, since they are substantially the same as those required by a pulley normally used, with dimensions equivalent to those of the pulley 36. This is owing not only to the fact that the wheel 4 is accommodated in the pulley 36, but also to the particular structural characteristics of the device 15.

In addition, owing to the use of the bearings 30, the forces of dissipation of friction exchanged between the rings 16 and 17 are extremely limited.

Finally, the device 15 guarantees that, even in the stage of starting the engine of the motor vehicle, relative rotation is guaranteed between the pulley 36 and the shaft 3. This relative rotation is determined substantially by the resistant torque generated by the inertia of the alternator 2, and is particularly advantageous in cases in which the alternator 2 is connected to diesel engines, which tend to "pull" to the extent that for alternators of a known type, it is necessary to connect the pulley 36 to the shaft 3 by means of a free wheel.

Finally, it is apparent from the foregoing description that modifications and variants which do not depart from the field of protection of the present invention can be made to the drive unit 1 described, for an alternator 2 of a motor vehicle.

In particular, the unit 19 could comprise a helical spring, or a plurality of helical springs, instead of the spring 20.

What is claimed is:

1. Drive unit (1) for an alternator (2) of a motor vehicle, the alternator comprising a drive shaft (3) which can rotate around its own first axis (6): said drive unit (1) comprising a driven pulley (36) which can rotate around its own second axis (37): and means (42) for connection of said pulley (36) to said drive shaft (3); characterised in that it additionally comprises a revolution-multiplier device (43) and a torque-limiter device (15), which are in series with one another, wherein said revolution-multiplier device (43) comprises inner toothing (45), which is coaxial relative to, and integral with said pulley (36), and a pinion (4) which can rotate around said first axis (6) and engages with said inner toothing (45): said torque-limiter device (15) facing said pinion (4) axially, and wherein said torque-limiter device (15) comprises a first ring (16) which is integral with said pinion (4), a second ring (17) which is keyed onto said drive shaft (3), and resilient means (19) for compressing the said first and second rings (16, 17) axially against one another.

2. Unit according to claim 1, characterised in that, relative to said drive shaft (3), said second ring (17) is axially sliding, whereas said pinion (4) is axially fixed.

3. Unit according to claim 1, characterised in that one (16) of said first and second rings is delimited axially by an undulating annular track (26), whereas the other (17) of said first and second rings supports a plurality of rotary bodies (30), which rotate around respective further axes (A), and are disposed in contact with the said undulating track (26).

4. Unit according to claim 3, characterised in said rotary bodies are defined by ball bearings (30) fitted onto respective radial arms (29) said second ring (17).

5. Unit according to claim 3, characterised in that said track (26) comprises a plurality of axial depressions (28), which are angularly spaced from one another around said first axis (6), and and are of a number equivalent to that of said rotary bodies (30).

6. Unit according to claim 1, characterised in that said resilient means (19) comprise a pre-loaded axial spring (20), which is fitted on said drive shaft (3), and in contact with said second ring (17).

* * * * *